June 18, 1940.    J. W. MARSH    2,205,300
POWER TRANSMISSION
Filed May 15, 1937    6 Sheets-Sheet 1
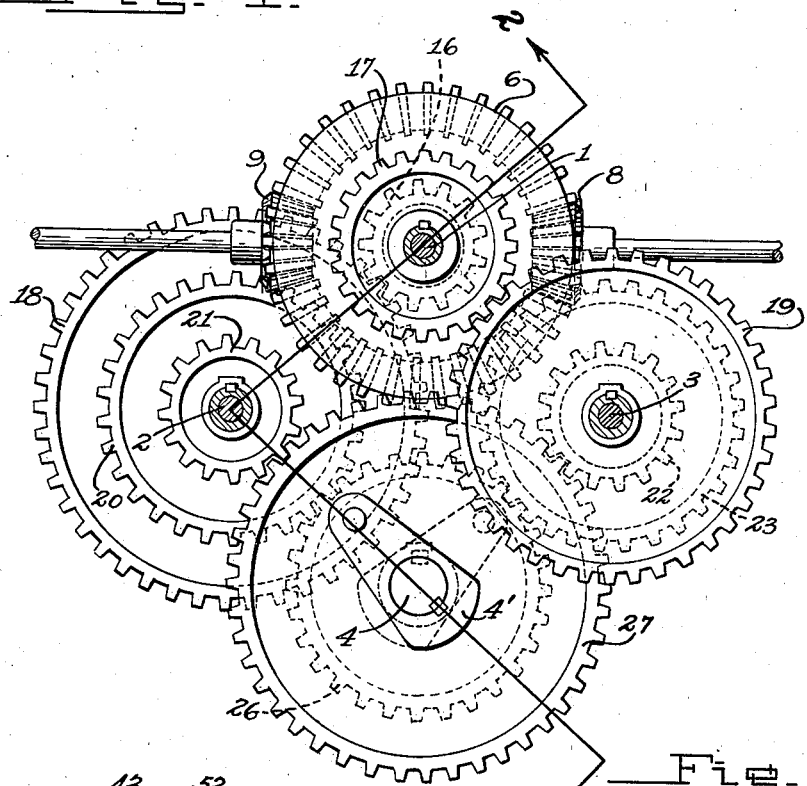
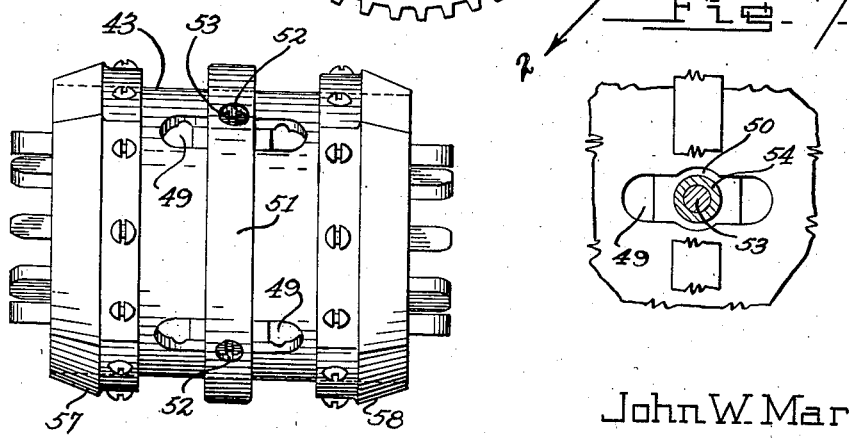
John W. Marsh
INVENTOR.
BY *[signature]*
ATTORNEY June 18, 1940.  J. W. MARSH  2,205,300
POWER TRANSMISSION
Filed May 15, 1937  6 Sheets-Sheet 2

John W. Marsh
INVENTOR.
BY
ATTORNEY

June 18, 1940.  J. W. MARSH  2,205,300
POWER TRANSMISSION
Filed May 15, 1937  6 Sheets-Sheet 3
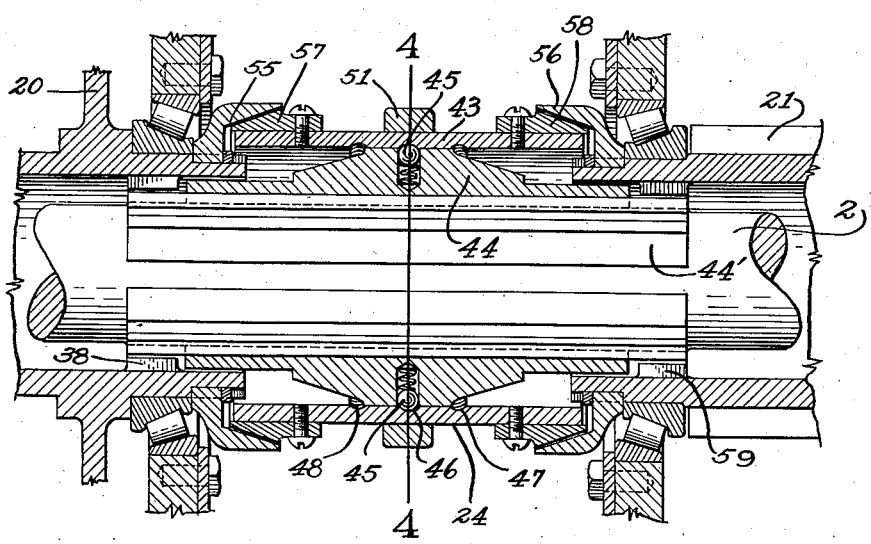
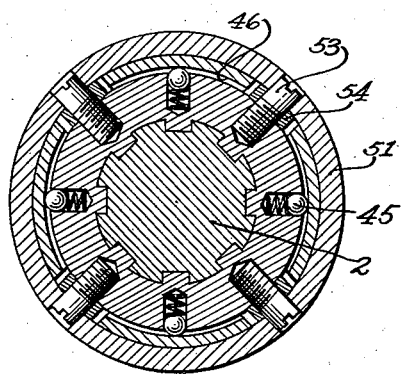
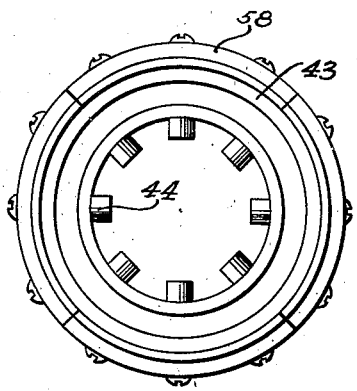
John W. Marsh
INVENTOR.
BY
ATTORNEY June 18, 1940.  J. W. MARSH  2,205,300
POWER TRANSMISSION
Filed May 15, 1937  6 Sheets-Sheet 4

John W. Marsh
INVENTOR.
BY
ATTORNEY

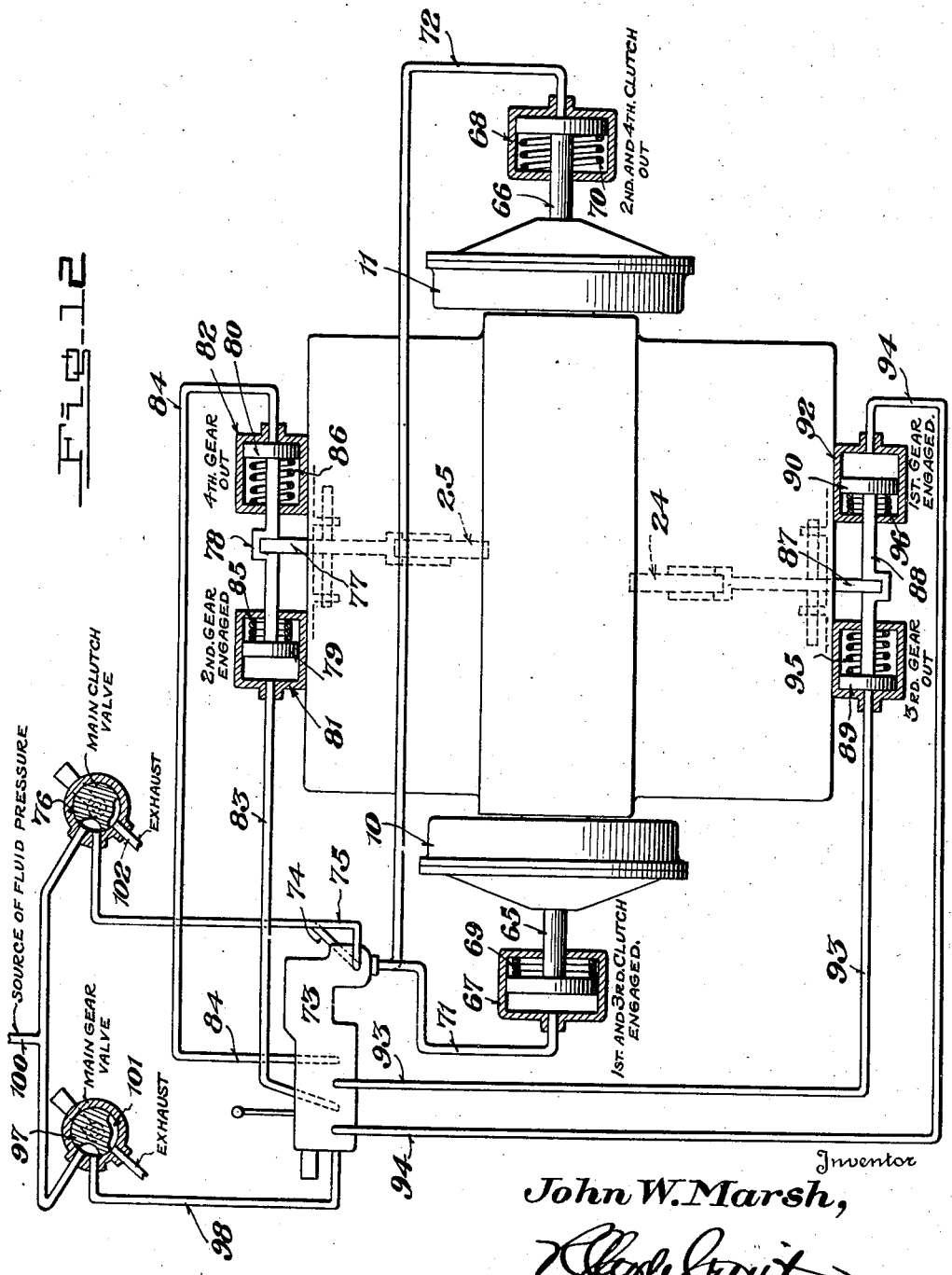

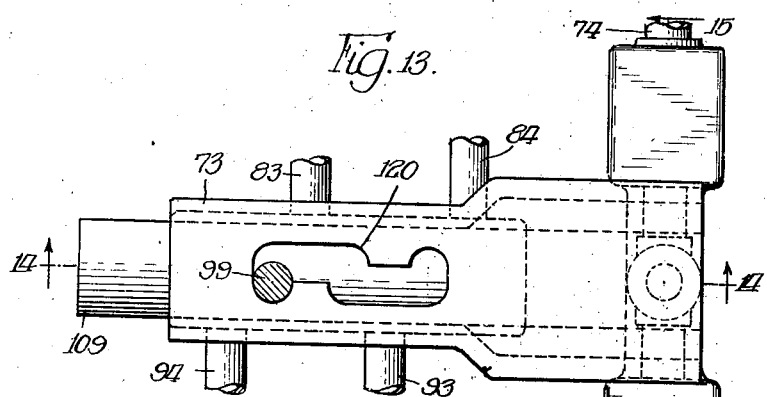
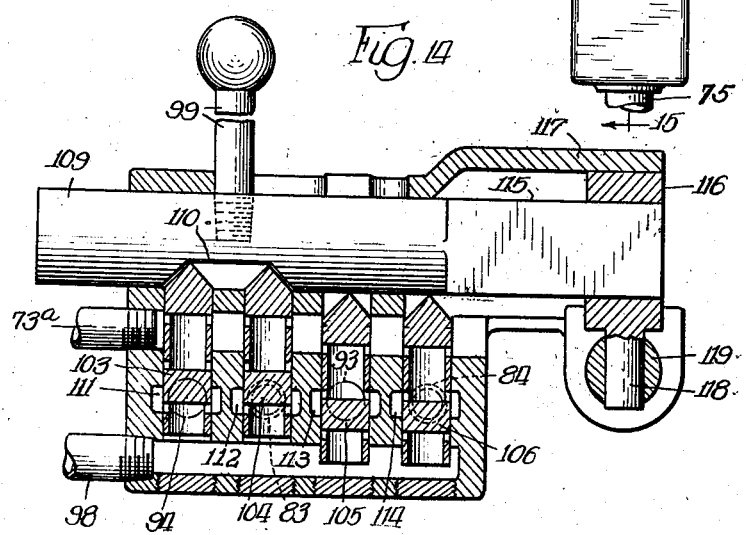
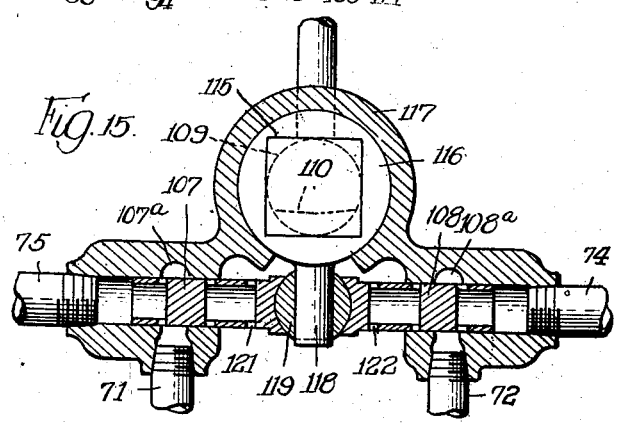

Patented June 18, 1940

2,205,300

UNITED STATES PATENT OFFICE 2,205,300

POWER TRANSMISSION

John W. Marsh, Alexandria, Va., assignor to Magee-Marsh Corporation, a corporation of Delaware Application May 15, 1937, Serial No. 142,897

6 Claims. (Cl. 74—360)

This invention relates to certain improvements in power transmission and torque transmitting devices and has for its object the provision of a novel mechanism comprising a combination of interrelated and cooperating parts, whereby the power or torque from a single prime mover, or a plurality of prime movers, is transmitted to a common driven shaft, selectively in either rotational direction, through a pair of clutches or the like, and a plurality of speed ratios between the prime movers and the common driven shaft is obtained without the usual loss of torque during the transition periods as heretofore experienced with other speed change mechanisms all accomplished with high efficiency.

Another object of the invention is the production of a mechanism capable of providing two paths of power between a driving shaft, or a plurality of driving shafts and a driven shaft, in combination with means for changing speed ratios in either power path independently of the other.

A further object is to provide a power transmission and speed reducing mechanism, wherein the slow speed shafts, carrying the greater torque are transverse to the high speed power input shaft or shafts, so that the transition of power from shafts placed longitudinally of a vehicle to shafts placed transversely to said vehicle may be accomplished by relatively small high speed gearing as distinguished from relatively large low speed gearing.

A further object of the invention is to provide means for rotatively synchronizing the speeds of shafts and gearing in a change speed mechanism, whereby a positive engagement of said gearing may be accomplished without clashing or deleterious results.

Another object of the invention is the provision of a mechanical gear transmission of the defined type wherein the gears are maintained at their proper centers and alignment regardless of shaft distortions so that the initial alignment and centers of the gears are maintained as in original assembly and all members may be readily replaced with a minimum disturbance of adjacent parts.

Another object of the invention is to provide a transmission assembly having multiple paths of power-flow through which the power may be selectively directed, with means in each power path for selectively varying speed ratios, one independently of the other, and with further means for operating said paths in either forward or reverse direction at any set speed.

Other objects of the invention will be apparent from the following specification when considered in connection with the accompanying drawings, to be hereinafter more specifically referred to.

Another object of this invention is a torque changing mechanism that comprises alternate paths of power, such as clutches, gearing, shafting, and the like, said alternate paths of power being arranged so that independently of each other and selectively each alternate path when disengaged can have its speed and torque changing characteristic for delivery of the power from the input shaft to the output shaft varied at will, and further, said alternate paths of power shall be provided with means that permit controllable overlap of the transmission of power during the period of transition wherein the power throughout is transferred from one path to the other; i. e., so that, at the same time that one alternate path passed from full engagement through partial engagement to complete disengagement, the alternate path simultaneously goes from complete disengagement to partial engagement to full engagement, and thereby securing continuity of torque delivery from the input to the output shaft. Completion of each such transition results in one path completely engaged and the other path completely disengaged, suitable gripping mechanism being provided in each alternate path to accomplish said engagement overlap and disengagement, so that high efficiency in a torque transmitting mechanism is achieved thereby.

Another object of the invention is the provision of a mechanical gear and shafting torque changing device, of the type defined, wherein the shafting in the operating condition is transmitting torsion only and is not subjected to any bending or other forces resulting from the action of the gearing and other power transmitting elements in the system when the gearing and other elements are transmitting power.

Another object of this invention is to provide a torque changing mechanism including gripping members and means for selectively providing variable speeds, all the operations of said transmission assembly being actuated by fluid or gas under pressure arrangements selectively by remote control, thereby permitting complete power control of the necessary actuating operations in such a single unit and further readily permitting two or more units of that type to be selectively controlled from a single operating station.

One embodiment of the invention is illustrated in the accompanying drawings, in which:

Figure 1 is a side elevation of the gear assembly showing the relative position of the essential parts with the clutches removed and the supporting case, bearings, and other parts not essentially a part of this invention omitted.

Figure 2 is a partial transverse sectional view of the mechanism on line 2—2 of Figure 1, showing one of the change speed transmission shafts, the driven shaft, and the common driving or main clutch shaft carrying individual clutches for each change speed transmission shaft, bevel gears and reversing clutch all with their related gears and engaging clutches, the other change speed transmission shaft and connecting gearing being omitted for the purpose of clearness in illustration.

Figure 3 is an enlarged detail sectional view illustrating the slidably engaging clutch member and synchronizing mechanism carried by each transmission shaft between the change speed gears freely mounted on the respective shafts.

Figure 4 is an enlarged detail view on line 4—4 of Figure 3 showing the internal mechanism of the clutch member and synchronizing device.

Figure 5 is an end view of the synchronizing device and clutch member as illustrated in Figures 3, 4 and 6 and Figure 6 is a side view thereof.

Figure 7 is a fragmentary view of the synchronizer and clutch device with part of the shifting band removed showing in detail the slot and enlargement therein.

Figure 10:
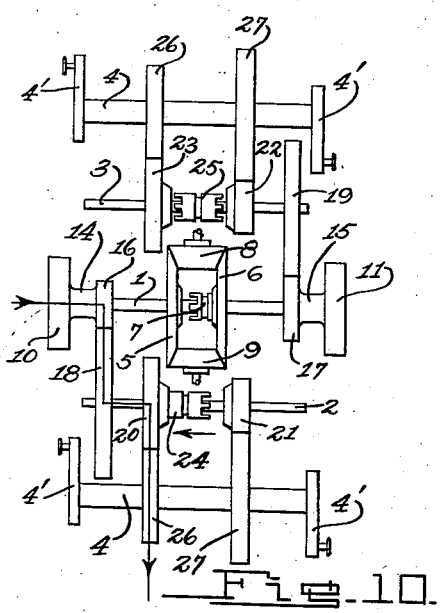
Figure 11:
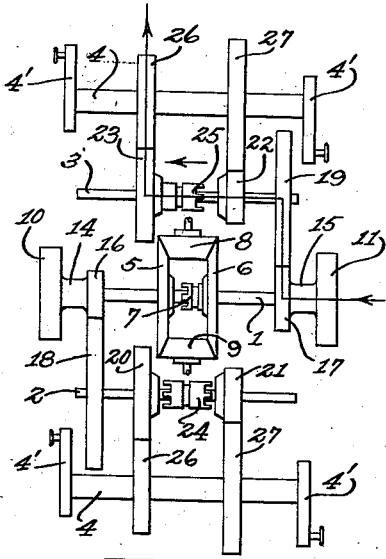

Figure 10 is also a diagrammatic view of the mechanism set for forward motion in third speed ratio and Figure 11 illustrates the mechanism set for forward motion in fourth speed ratio, it to be understood that while two final driven shafts are shown diagrammatically in each figure, actually only one such driven shaft is used, the two shafts shown being coincident in application as illustrated in Figure 1.

Figure 12 is a diagrammatic view of one means for operating the various clutches.

Fig. 13 is a plan view of the slide valve 73 shown in Fig. 12;

Fig. 14 is a sectional view on the line 14—14 of Fig. 13, and;

Fig. 15 is a sectional view on the line 15—15 of Fig. 13.

Figure 2:
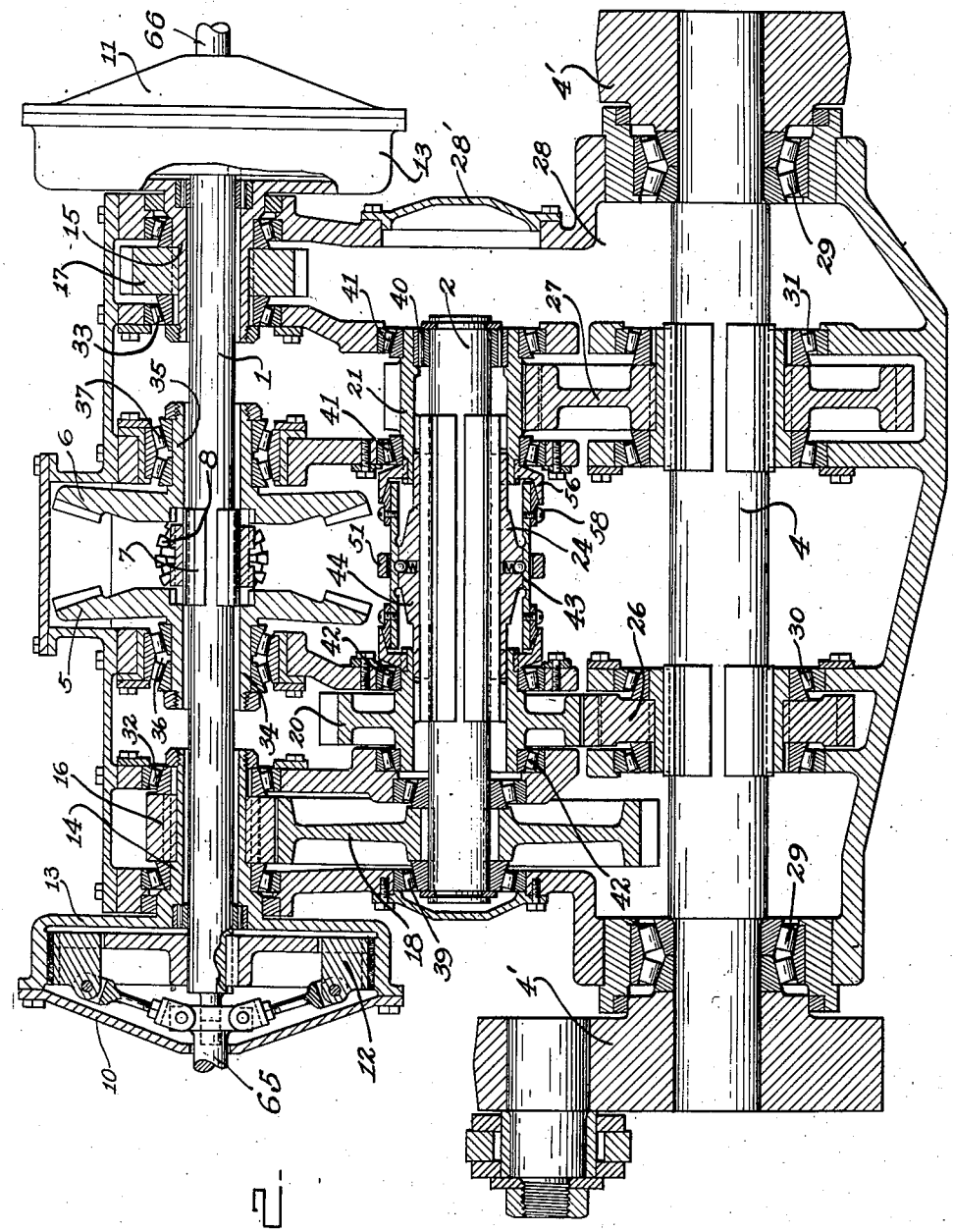
Figure 8:
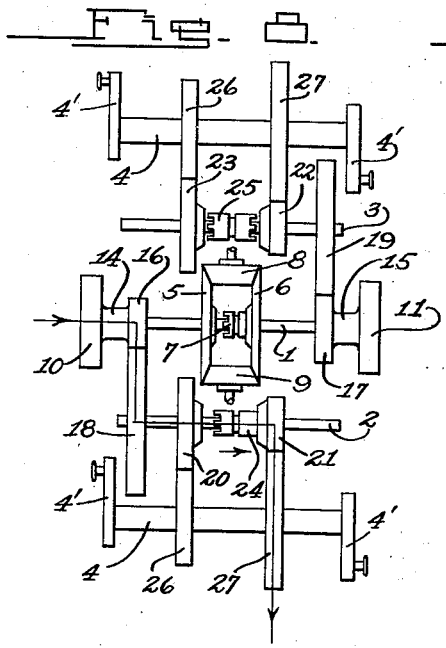
Figure 8 is a diagrammatic view of the mechanism set for forward motion in first and lowest speed ratio showing the path of power from the common clutch shaft to the final driven shaft.
Figure 9:
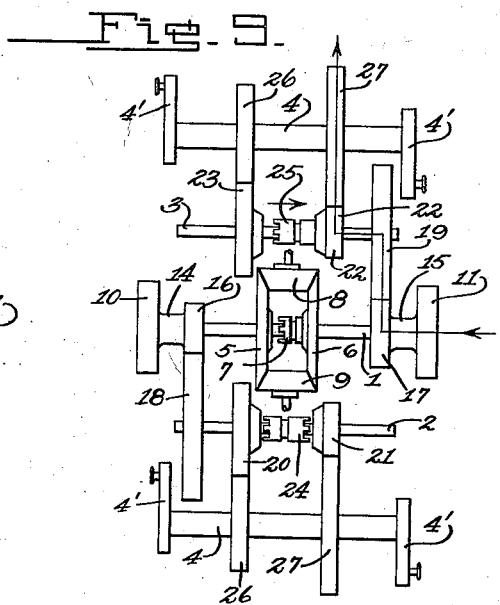
Figure 9 is a similar view with the mechanism set for forward motion in second speed ratio.

Referring to the drawings in detail and particularly in Figures 1, 2 and 8, the transmission comprises essentially a common main drive shaft 1, a change speed or transmission shaft 2, a second change speed or transmission shaft 3 and a common driven shaft 4.

These shafts 2 and 3 are referred to in some instances in the appended claims as "supplemental drive shafts."

Freely carried by the main drive shaft 1, preferably at its intermediate portion, are a pair of bevel gears 5 and 6 and slidably keyed to this shaft between said bevel gears is a clutch member 7 whereby these gears may be selectively secured to said shaft 1 for the purpose to be hereinafter described.

Constantly in mesh with the bevel gears 5 and 6 are a pair of mating bevel gears 8 and 9 (Figures 8 to 11), which are the driving gears receiving their power from separate prime movers one arranged at each end of the vehicle where the transmission is mounted on a vehicle, it to be understood that in such cases the main drive shaft 1, change speed shafts 2 and 3 and the driven shaft 4, are arranged transversely of the vehicle.

Where only one prime mover is employed of course only one bevel gear such as 8 or 9 is used.

With this relation of the bevel gears 5 and 6 and 8 and 9 it will be noted that said gears 5 and 6 will be driven in opposite rotational directions and the main drive shaft 1 can be rotated in either direction according to the engaged position of the clutch member 7.

Mounted on the opposite ends of the main drive shaft 1 are main clutches 10 and 11 each clutch comprising generally an engaging part 12 secured to said shaft and a cooperating clutch drum or the like 13 loosely mounted on said shaft (Figure 2). These clutch drums 13 are provided with integral cylindrical extensions or sleeves 14 and 15 concentrically positioned with respect to the shaft 1 and have secured thereto gears or the like 16 and 17 respectively, said gears being of different diameters, whereby different speeds may be obtained from the shaft 1 according to the selective engagement of the main clutches 10 or 11. These main clutches 10 and 11 are preferably interconnected so that as one clutch is engaged the other clutch is automatically disengaged.

The change speed shafts 2 and 3 are preferably arranged parallel to the main drive shaft 1 and to each side and below said drive shaft, the shaft 2 as illustrated, comprising the first and third speed shaft and shaft 3 the second and fourth speed shaft this of course being a matter of gear arrangement.

Secured to one end of change speed shaft 2 is a gear 18 in mesh with main drive shaft clutch gear 16 and secured to one end of change speed shaft 3 is a similar gear 19 meshing with the other main drive shaft clutch gear 17. The gears 18 and 19 and 16 and 17 are of the proper diameters to give the desired ratios between these gears whereby different speeds will be imparted to the respective change speed shafts 2 and 3 according to which of the main clutches 10 and 11 are engaged.

In addition to the gear 18 the first and third change speed shaft 2 has loosely mounted thereon pinions 20 and 21 and correspondingly the third and fourth change speed shaft 3 has loosely mounted thereon pinions 22 and 23 the pinions 21 and 22 being of smaller diameter than the pinions 20 and 23. Slidably keyed to the shaft 2 between the loosely mounted pinions 20 and 21 is a clutch member 24 whereby said pinions 20 and 21 may be selectively engaged and locked to the shaft 2 according to the gear ratio desired. Similarly, the third and fourth change speed shaft 3 is provided with a clutch member 25 slidably keyed thereto in position to engage the loosely mounted pinions 22 and 23 for selective speed change. These clutch members are of the same construction and design, each includes a synchronizing device to be hereinafter described in detail.

The diagrammatic Figures 8 to 11 show two final driven shafts 4 but as hereinbefore stated there is only one driven shaft and this showing is merely for the purpose of illustration. The pinions 20 and 23, of the respective change speed shafts 2 and 3, are in mesh with a gear 26 secured to the final driving shaft 4 and the pinions 21 and 22 of said shafts are in mesh with a gear 27 also secured to the driven shaft 4.

Referring to Figure 2, all of the above mechanism is mounted in a case or like housing 28 the ends of the lower or final driven shaft 4 being provided with antifrictional bearings 29 and the intermediate portions of said shaft adjacent the pinions 26 and 27 being provided with antifrictional bearings 30 and 31 respectively, the extreme end portions of the final driven shaft 4, extending outwardly from the case 28 being provided with the necessary driving connections such as cranks or the like 4'.

As hereinbefore stated the cylindrical extensions 14 and 15 of the main clutch drums 13 have secured thereto gears 16 and 17 concentrically positioned loosely on the opposite ends of the main drive shaft 1 and this drive shaft is journalled in the upper portion of the case 28, antifrictional bearings 32 and 33 being interposed between the respective cylindrical extensions 14 and 15 of the main clutch drums 13 and the case or housing.

The bevel gears 5 and 6, also loosely mounted on the intermediate portion of the shaft 1, are provided with cylindrical extensions or sleeves 34 and 35 respectively and antifrictional bearings 36 and 37 whereby said sleeves are freely mounted for rotation in the case or housing 28 and concentrically positioned with respect to the main drive shaft 1, as clearly shown in Figure 2.

Located between the drive shaft 1 and the final driven shaft 4 are the change speed shafts 2 and 3 but for the purpose of clearness in illustration, change speed shaft 2 and its pinions only is shown in Figure 2, it to be understood that change speed shaft 3 would be directly behind said shaft 2. Gear 19 carried by change speed shaft 3, which normally would be in mesh with gear 17 has also been omitted.

Again referring to Figure 2, and the change speed shaft 2, that end of said shaft having secured thereto the gear 18, is provided with antifrictional bearings 39 and the opposite end of said shaft is rotatably mounted concentrically within the hub of the pinion 21 upon antifrictional bearings 40. The pinion 21 is in turn antifrictionally mounted for rotation within the case 28 upon bearings 41. The other pinion 20, concentrically mounted for rotation about the shaft 2, is antifrictionally supported in the case 28 by roller bearings or the like 42. Both of these pinions 20 and 21 are supported independently of the shaft 2 within the case or housing 28 but are adapted to be selectively locked to said shaft by the sliding clutch member 24 as hereinbefore stated.

With the method and manner of antifrictionally mounting the various shaft, gears and pinions within the case or housing 28, said gears and the like will be unaffected by any warpage or distortion of the shafts due to external or internal strains, temperature changes or other causes under operative conditions. Gear 18 being mounted on the splined end of shaft 2 and gear 19 similarly mounted on the splined end of shaft 3 said shafts are free to warp or distort without affecting said gears 18 and 19 and under load are subject to torsional stress only. Also the mounting of shaft 4 will permit said shaft to expand relative to the casing 28. It is also contemplated to divide the case 28 horizontally along the center line of shaft 4, whereby the lower section with shaft 4 and associated parts may be removed independently of the other mechanisms within the case. It will be further noted that all the shafts are readily removable and replaceable with a minimum disturbance of associated parts, particularly that the pinion 21 and the entire synchronizing and engaging clutch member 24 are readily removable and replaceable through a cover plate 28'. In addition, the frictional segments 57 and 58 of the synchronizing mechanism hereinafter described are removable from and replaceable on the shell 43 with said shell and its associated mechanism in place.

With particular reference to Figure 3, the clutch member 24 is a combined clutch and synchronizing mechanism comprising a shell 43 surrounding a splined engaging clutch portion 44 slidably mounted on a correspondingly splined section 44' of the shaft 2, and is adapted to selectively engage splines 38 and 59 carried by the pinions 20 and 21 respectively. This engaging portion 44, is capable of longitudinal motion with respect to the shell 43, but is resiliently restrained from such longitudinal movement by a plurality of resiliently supported balls 45, mounted in the engaging clutch portion and cooperating annular grooves 46, 47 and 48 formed in the internal periphery of the shell 43. The shell 43 is also provided with a plurality of circumferentially spaced openings or slots 49 (Figures 6 and 7), each having at its intermediate portion a semi-circular enlargement 50. Encircling the shell 43 is a clutch shifting ring or band 51 having a series of spaced holes or the like 52 adapted to receive cooperating studs 53 projecting outwardly from the engaging clutch portion 44, said studs passing through the slots 49 into said ring 51, whereby upon a shifting of the ring 51 through a shifting fork or the like (not shown) the splined engaging clutch portion 44 is moved longitudinally on the splined section 44' of the shaft 2 to engage either the first speed pinion 21 or the third speed pinion 20 of said change speed shaft 2. Surrounding each stud 53 is a roller 54, the purpose of which will be hereinafter explained.

Secured to the pinions 20 and 21 adjacent the ends of the shell 43 are annular friction members 55 and 56 respectively in position to be selectively engaged by annular friction segments 57 and 58 secured to the opposite ends of said shell 43. Although this combined clutch and synchronizing device has been described with respect to change speed shaft 2 it is to be understood that change speed shaft 3 is likewise provided with a similar device and the same is used to provide the necessary selective engagement between the change speed shaft 2 and either of its pinions 20 or 21 and between change speed shaft 3 and either of its pinions 22 or 23 as diagrammatically illustrated at 24 and 25 in Figures 8 to 11 inclusive.

In the operation of this synchronizing and clutch device, when the band or ring 51 is shifted longitudinally with respect to shaft 2 in the direction of pinion 21, this motion is transmitted through studs 53 to the splined engaging clutch portion 44, which owing to the engagement of the balls 45 with the groove 46, moves the shell 43 until friction segments 58 engage the friction member 56 secured to the pinion 21. Since the pinion 21 is always in mesh with the gear 27 on the final driven shaft, said pinion will be rotated on its shaft 2, as long as the complete transmission is in operation. As the friction segments 58 engage the friction member 56 the shell 43 will be rotated until the rollers 54 on the studs 53 engage the enlargement 50 in the slots 49. Further rotation of the shell 43 will be imparted to the splined engaging clutch portion 44 and to the shaft 2, gear 18, pinion 16 and clutch drum 13.

It will be apparent that any frictional torsional reactance between segments 58 and friction member 56 caused by a difference in rotation speeds of the synchronizing and splined clutch mechanism and the pinion 21 will maintain the engagement between the rollers 54 and enlargements 50 so that pressure applied to band 51 longitudinally in respect to the said clutch mechanism, will continue to urge frictional engagement between segments 58 and members 56 and not move the splined clutch members 44 longitudinally on the shaft 2. It will be further apparent that the force tending to hold the rollers 54 in engagement with the enlargements 50 will be a function of the force required to accelerate or decelerate the shaft 2 and its related parts and that such force will continue to hold rollers 54 in engagement with enlargements 50 until the rotative speeds of pinion 21 and shaft 2 are equal, when the force holding rollers 54 in engagement with said enlargements 50, will be reduced to an extent which will permit the longitudinal force applied to band 51 to move the splined clutch portion 44 longitudinally on the shaft 2 until the splines in the clutch portion 44 engage the splines 59 on the internal periphery of the pinion 21.

It will be evident, moreover, that the disengagement of rollers 54 from the enlargements 50 will give the splined clutch 44 a slight rotation relative to the shell 43 and pinion 21, thereby materially assisting in the engagement of clutch splines with the splines 59. The longitudinal movement of the splined clutch 44 relative to the shell 43 moves the balls 45 out of engagement with the groove 46 and at the completion of the travel of splined clutch 44 on shaft 2 engages balls 45 with the groove 47, thereby centralizing shell 43 and maintaining disengagement between the friction segments 57 and 58 and friction members 55 and 56 respectively.

The above described operation with respect to change speed shaft 2 and pinion 21 also applies to the clutching and declutching of change speed shaft 2 and pinion 20 and to the gears and pinions on change speed shaft 3.

With reference to the operation of the transmission as a whole, when the prime mover shafts are turning in opposite directions, the motion of both will be transmitted to the bevel gears 5 and 6 by the bevel gears 8 and 9 whereupon longitudinal movement of the clutch member 7 will secure either bevel gear 5 or 6 to the main drive shaft 1 for forward or rearward motion of the vehicle as desired.

Thereafter either main clutch 10 or 11 can be engaged and disengaged at will and the torque of the bevel gears 5 and 6 as selected, can be transmitted to either main drive shaft gear 16 or 17. Since gear 16 meshes with the gear 18 on the change speed shaft 2 and gear 17 meshes with gear 19 on the change speed shaft 3, either change speed mechanism can be engaged or disengaged at will from the bevel gear prime source or sources of power. With clutch 10 engaged and clutch 11 disengaged, power will be transmitted through change speed shaft 2 to final driven shaft 4 in first or lowest speed ratio, as shown diagrammatically in Figure 8 and pinions 22 and 23 in change speed shaft 3 will be idling, thereby permitting synchronization through clutch member 25 and an engagement of said shaft 3 with pinions 22. In this condition, as shown diagrammatically in Figure 9, the simultaneous disengagement of clutch 10 and engagement of clutch 11 will effect a change from first to second speed without loss of torque to the final driven shaft 4.

With reference to the clutches 10 and 11, it is preferred that said clutches be of a type providing a gradual and easy engagement and disengagement to the extent of a slight slippage both upon engagement and disengagement, whereby an overlapping of engagement and disengagement of the two clutches within allowable limits will be permitted, tending towards a much smoother and efficient operating mechanism as a whole.

When the transmission is in second speed ratio, with clutch 11 engaged and driving through change speed shaft 3, pinions 20 and 21 on change speed shaft 2 are idling and by a movement of its synchronizing and engaging clutch member 24, the third speed gear 20 can be engaged to the change speed shaft 2, as illustrated diagrammatically in Figure 10. After this engagement, a simultaneous disengagement of clutch 11 and engagement of clutch 10 will produce a transition from second to third speed ratio without loss of torque to the final driven shaft 4.

The change from third speed ratio to fourth speed ratio can be similarly accomplished by disengaging pinion 22 and engaging gear 23 to change speed shaft 3 as shown diagrammatically in Figure 11, after which clutch 10 is simultaneously disengaged with the engagement of clutch 11.

It is further noted that speed change ratios can be accomplished from high to low ratios similarly to changing from low to high ratios without loss of torque to the driven shaft 4. The various clutch engagements required and the various gearing steps in the directions and speed ratios provided are summarized as follows:

Forward or reverse motion is accomplished by engaging clutch member 7, slidably mounted on drive shaft 1, with either bevel gear 5 or 6.

*First or lowest speed ratio.*—The following clutches are engaged: Main clutch 10, clutch 24 to pinion 20. Power is transmitted through the following gears and shafts: gears 16 and 18, shaft 2, gears 20 and 26, shaft 4.

*Second speed ratio.*—The following clutches are engaged: Main clutch 11, clutch 25 to pinion 23. Power is transmitted through the following gears and shafts: gears 17 and 19, shaft 3, gears 23 and 26, shaft 4.

*Third speed ratio.*—The following clutches are engaged: Main clutch 10, clutch 24 to pinion 21. Power is transmitted through the following gears and shafts: gears 16 and 18, shaft 2, gears 21 and 27, shaft 4.

*Fourth or highest speed ratio.*—The following clutches are engaged: Main clutch 11, clutch 25 to pinion 22. Power is transmitted through the following gears and shafts: gears 17 and 19, shaft 3, gears 22 and 27, shaft 4.

This shifting of the main clutches 10 and 11 and the supplemental clutches 24 and 25, on the change speed shafts 2 and 3, is preferably accomplished by fluid pressure as diagrammatically illustrated in Figure 12.

With particular reference to Figure 12 it will be noted that the main clutches 10 and 11 are provided with clutch operating shafts 65 and 66 respectively. The outer ends of these shafts 65 and 66 are formed as pistons, operating in cylinders 67 and 68, said pistons being urged outwardly by springs or the like 69 and 70 respectively for normally maintaining said clutches in disengaged position.

Connected to the outer ends of these cylinders 67 and 68 are conduits 71 and 72 running to a slide valve positioned in one end of a valve casing 73, said valve being in communication with a source of fluid pressure by way of conduits 74 and 75 and a main clutch control valve 76, whereby fluid under pressure may be admitted to the main clutch operating cylinders 67 and 68 through and under the control of the aforesaid slide valve in the valve casing 73.

Still referring to Figure 12 it will be further noted that the clutches 24 and 25 on the change speed shafts are also under the control of fluid pressure. The clutch 25 is provided with an operating lever 77 connected to a cross arm 78, the opposite ends of said arm being provided with pistons 79 and 80 operating in cylinders 81 and 82 respectively. The outer ends of these cylinders 81 and 82 are in communication with conduits 83 and 84 running to a control valve mechanism mounted in the valve casing 73 and opposing the action of the fluid pressure in the cylinders 81 and 83 are expansion springs or the like 85 and 86.

Likewise the clutch 24 is provided with an operating lever 87 connected to a cross arm 88 carrying pistons 89 and 90, operating in cylinders 91 and 92 respectively, in communication with fluid pressure conduits 93 and 94 running to the control valve mechanism in the valve casing 73 said pistons 89 and 90 also being provided with expansion springs 95 and 96 opposing the action of the fluid pressure.

The fluid pressure for these conduits 83, 84, 93 and 94 is supplied through a main gear shift valve 97 by way of a conduit 98 in communication with the control valve mechanism in the valve casing 73, the selective operation of the main clutches 10 and 11 and also the change speed clutches 24 and 25 through their proper fluid pressure conduit, being controlled by the lever 99 operating any preferred type of valve mechanisms within the casing 73. This particular form of valve mechanism forms no part of the present invention and it is thought unnecessary to illustrate the same in detail.

The main clutch control valve 76 and the main gear shaft valve 97 are each connected to a common source of fluid pressure 100 and said valves are provided with exhaust ports 101 and 102 respectively whereby upon the closing of communication between the main source of fluid pressure and the fluid pressure conduits connected to the clutch operating fluid pressure cylinders, said conduits will exhaust back through the valves 76 and 97 and the various clutches will be returned to their neutral positions.

The structure of the slide valve by which I am enabled to properly actuate the different clutches is shown in detail in Figs. 13, 14 and 15. In these figures I have shown the valve body, indicated generally by the numeral 73, having mounted thereon four plungers 103, 104, 105 and 106 and transversely located plungers 107 and 108. Fluid under pressure delivered to the valve body through the pipes 98, 74, 75 serves to actuate said plunger as hereafter described.

Slidably and rotatably mounted within the valve body is a member 109 to which the gear shaft lever 99 is connected, the lever projecting through a cut-out 120 in the valve body, the cut-out being so formed that the lever may be moved longitudinally and angularly as required. The slide 109 has a notch 110 on its lower surface shaped to accommodate the V-shaped upper ends of two of the plungers 103 to 106. In the position shown in the drawings, fluid pressure admitted through the pipe 98 passes through pipes 94, 83 to the cylinders that actuate first and second gears, the ports 111, 112, 113 and 114 providing connecting passages to the pipes 94, 83, 93 and 84. In the position shown in the drawings, pressure is being admitted through ports 111, 112 to the respective cylinders while ports 113, 114 are exhausting into the main exhaust pipe 73a.

The means for actuating the main clutch comprises the slide 109 having on its squared portion 115 a ring 116 journalled in the portion 117 of the valve body and provided with a pin extension 118. This pin engages a ball 119 in such manner that angular motion of the slide serves to transmit axial motion to the plungers 107, 108 in a manner similar to that of a Scotch yoke. With the shift lever 99 in central position as shown in the drawings and with the main clutch valve 76 in open position, pressure is admitted through ports 108a, 107a to the pipes 72, 71 and thus to the main clutches 11, 10. When the shift lever is moved angularly to the left, as viewed in Fig. 15, pressure is admitted through the port 107a, to pipe 71 to actuate clutch 10 and to open pipe 72 to exhaust, through port 122, thus permitting the spring 70 to release clutch 11; reversal of movement will serve to actuate clutch 11 and to release clutch 10 by exhausting the pressure through port 121.

It will be apparent that the rapidity of clutch action following movement of the control valve handle 99 will depend on the viscosity of the fluid medium employed, and with the engaging and disengaging characteristics of the clutches. Figure 15 shows a "positive lap" position in the control valve with both clutches apparently engaged when the control valve handle is in central angular position. Such positive lap is necessary when the fluid medium is rapid in action, as for instance is compressed air, and when the characteristics of the clutches include relatively slow engagement and rapid disengagement, to insure the engagement of one clutch before the other disengages, it being the intent that one clutch should pick up the load as the other relinquishes it. The exact amount of lap must be determined experimentally and will vary with the fluid medium used, size and length of conduits, and clutch characteristics. Should the control valve handle be maintained in central angular position, both clutches will be engaged and slipping. This procedure can be used in starting a heavy load to distribute the wear between the clutches, but the normal operation will be to move the control handle from extreme angular position to the other for which condition the amount of lap is determined.

From the preceding description, it will be apparent that angular movement of the shift lever 99 controls the main clutch action while axial movement controls the gear shift clutches. The cut-out 120 in the valve body is arranged to permit the engagement of either clutch when first and second, second and third, or third and fourth gears are engaged but to prevent the engagement of the wrong clutch during transition stages.

From the foregoing description it will be apparent that when one main clutch is engaged the other is disengaged and any desired overlapping of engagement and disengagement may be obtained by the proper timing of the valve mechanism in the valve casing 73 under the control of the operating lever 99. Furthermore, various gear shifting combinations are possible, through the devices just described for operating the clutches 24 and 25, dependent upon the construction and operation of the control valve in the valve casing 73.

For example, with the main clutch control valve 76 and main gear shift valve 97 open to exhaust the engine is started and warmed up. The valve operating lever 99 is then moved to put change speed gear shifting cylinders 92 and 81, through conduits 94 and 83, in communication with conduit 98 to shift clutches 24 and 25 into first and second speed position, upon the operation of valve 97 to the position as shown. As the valve operating lever 99 is moved as above described, said movement also establishes communication between conduit 71 of the clutch operating cylinder 67 of main clutch 10 and the main clutch control valve 76, so that as this valve is operated, following the operation of valve 97, driving connection will be established through shaft 1 gear 16 gear 18 gear 21 and gear 27 on the driven shaft 4, as illustrated in Fig. 8, the same being the first speed drive.

By a proper manipulation of the operating lever 99 and the main control valves 76 and 97, speed ratios from first to fourth speed may be obtained, together with any desired overlapping of engagement and disengagement of the main clutches 10 and 11, whereby various gear shifting operations can be performed for changing speed ratios, and the main clutches can be engaged and disengaged without interruption to the flow of power or loss of torque from the driving element to the driven element.

The foregoing specification and accompanying drawings describe and illustrate one application of the basic principles of using a plurality of power transmissions with speed changing mechanisms between a power input and a power output mechanism, with means for transmitting power through any of the transmissions or speed changing mechanisms.

It is of course to be understood that the invention is to be limited to the detail construction and arrangement only so far as defined by the scope of the appended claims.

In the appended claims the terms "driving" and "driven" clutch members are used for convenience in designation. It should be understood, however, that a reversal of arrangement of the clutch parts is contemplated and the claims should be so construed.

What I claim is:

1. In a transmission, the combination with an input main power drive and a driven member, of a series of supplemental power drives therebetween, a pair of main clutches for alternately connecting and disconnecting said main drive to any one of the supplemental drives, fluid pressure means for simultaneously operating said main clutches, clutches for selective change speeds associated with said supplemental drives, fluid pressure means for operating said last mentioned clutches, and mechanical means for coordinating the respective fluid pressure actuating means.

2. In a transmission, the combination with an input main power drive and a driven member, of a series of supplemental power drives therebetween, a pair of main clutches for alternately connecting and disconnecting said main drive to any one of the supplemental drives, fluid pressure means for simultaneously operating said main clutches, clutches for selective change speeds associated with said supplemental drives, fluid pressure means for operating said change speed clutches and a common control means for all of said fluid pressure means.

3. In combination, a drive shaft having two power delivery points, two transmission shafts, friction clutches for selectively connecting the transmission shafts to the points of power delivery, fluid pressure means for simultaneously actuating said clutches to engage one to substantially the extent that the other is disengaged, change speed gears on said transmission shafts, with fluid pressure means for independent manipulation of the gears of the separate transmissions, a driven shaft connected to both said transmissions, and mechanical means for coordinating the respective fluid-pressure-actuating means.

4. In a transmission, the combination of a drive shaft having a connection to a prime mover, means for reversing the direction of rotation of said shaft relative to the rotation of the prime mover, two clutches each having its driving member rigid with said shaft, two transmission shafts each of which is permanently gear-connected to a driven member of said clutches, independently operable change-speed mechanisms applied to said transmission shafts, fluid pressure means for selectively actuating said clutches and said change speed mechanisms, and a common control means for all of said fluid pressure means.

5. In combination, a drive shaft, having a connection to a prime mover, means for reversing the direction of rotation of said shaft relative to the rotation of the prime mover, two friction clutches, each having its driving member rigidly connected to said shaft, two transmission shafts having change-speed gears thereon, each of which shafts is permanently gear-connected to a driven member of said friction clutches, independently operable fluid pressure means for changing the ratio of the gears of the respective transmission shafts, fluid pressure means for selectively actuating said friction clutches, and mechanical means for coordinating the respective fluid-pressure-actuating means.

6. In combination, a drive shaft having a connection to a prime mover, means for reversing the direction of rotation of said shaft relative to the rotation of the prime mover, two friction clutches, each having its driving member rigidly connected to said shaft, two transmission shafts having change-speed gears thereon, each of which shafts is permanently gear-connected to a driven member of said friction clutches, independently operable fluid pressure means for changing the ratio of the gears of the respective transmission shafts, and fluid pressure means for causing engagement of one of said friction clutches and for causing disengagement of the other friction clutch, and common mechanical means for actuating the respective fluid-pressure-actuating means.

JOHN W. MARSH.